Figure 1:
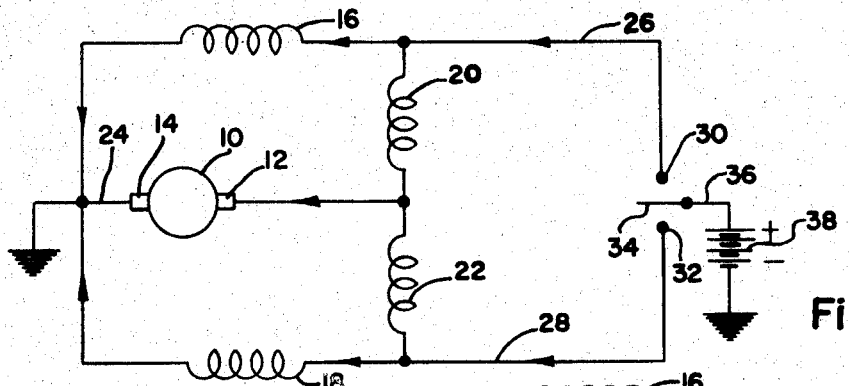

March 31, 1964     H. B. SMITH     3,127,549
REVERSING CIRCUIT FOR COMPOUND WOUND MOTOR
Filed April 4, 1960

INVENTOR.
*Harold B. Smith*
BY
*W. E. Fisher*
His Attorney

United States Patent Office 3,127,549
Patented Mar. 31, 1964

3,127,549
REVERSING CIRCUIT FOR COMPOUND WOUND MOTOR
Harold B. Smith, Rochester, N.Y., assignor to General Motors Corporation, Detroit, Mich., a corporation of Delaware
Filed Apr. 4, 1960, Ser. No. 19,927
4 Claims. (Cl. 318—298)

This invention pertains to dynamoelectric machines, and particularly to direct current motors which are adapted to be operated in both directions of rotation.

There are numerous applications in an automobile for reversible direct current motors, namely, seat adjusters, window lifts, top lifts, and other devices which are designed for movement in two directions. Heretofore, direct current motors of the split series field winding type, split shunt field winding type, series reversible type and reversible compound wound type have been manufactured.

The most common reversible direct current motor is of the split series field winding type since it requires the use of a relatively simple single pole double throw switch. However, the split series field winding reversible motor does not make the most efficient use of the copper since only half of the copper field winding is energized for rotation in a given direction. Furthermore, since the no load speed of large series motors can be self-destructive, and that of small series motors can be objectionable for noise and inertia, small series motors are usually equipped with damper windings to reduce the no load speed, which damper windings further reduce the motor efficiency. A damper winding commonly used in split series field winding reversible direct current motors is disclosed in Porter Patent 2,768,317.

The split shunt reversible motor is also extensively used. However, the split shunt field winding motor does not have the high stall torque characteristics which can be obtained with the split series field winding reversible motor, while having the same inefficient use of copper in that only half of the field winding is energized for any given direction of rotation. In addition, the split shunt field winding reversible motor cannot be operated with a single pole double throw switch, and thus adds to the expense of using the split shunt field winding motor.

The series reversible motor has the advantage that all of the copper is used for any given direction of rotation. However, since the current flow must be reversed through the armature, a double pole double throw switch is required with the series reversible motor.

The known compound reversible direct current motors have a variety of forms, but none of them combine using all of the field copper in both directions of rotation and simple single pole double throw switching. Two types of reversible compound direct current motors are shown in Thomas Patent 2,452,966. In one type the entire shunt field is energized during both directions of rotation while only one half of the series winding is energized for a given direction of rotation. In a second type the entire series field winding is energized during both directions of rotation and only one half of the shunt winding is energized during a given direction of rotation. Both of these types of reversible compound motors require rather complicated switch mechanisms, either of the double pole double throw type or the triple pole double throw type, and accordingly have not been extensively used.

This invention relates to a split compound reversible motor wherein efficient use of all of the copper is made since all windings are energized for rotation in either direction, and in addition the split compound reversible motor can be controlled by a simple single pole double throw switch. Accordingly, among my objects are the provision of a compound wound reversible dynamoelectric machine in which all windings are energized in both directions of rotation; the further provision of a split compound reversible direct current motor in which the direction of rotation can be controlled with a single pole double throw switch; the further provision of a split compound reversible direct current motor having high stall torque and relatively low no load speed; and the still further provision of a multiple speed compound wound direct current motor.

The aforementioned and other objects are accomplished in the present invention by reversing the direction of current flow through the series field winding to control the direction of motor rotation. Specifically, the improved split compound motor includes a split series field winding, a split shunt field winding, and a conventional wound armature with or without damper windings. The junction of the series field windings is connected through one motor brush to one point of the armature winding, and the junction of the shunt field windings is connected through the other brush to an opposite point of the armature winding. The other end of one shunt field winding and the other end of one series field winding are connected to one fixed contact of the single pole double throw switch, and the other ends of the other shunt field and series field windings are connected to the other fixed contact of the single pole double throw switch. The movable contact of the single pole double throw switch is connected to one terminal of the direct current power supply, and the common junction of the shunt field winding and armature is connected to the other terminal of the direct current power supply.

Accordingly, during both directions of rotation, all parts of the field windings are energized. The two parts of the shunt field winding provide magnetic excitations which buck each other. However, since only the favorable part of the shunt field winding is energized at full voltage, the magnetic flux produced by the shunt field portion favorable to the direction of rotation will prevail. The resultant motor combines high stall torque with low no load speed, this characteristic resulting from the configuration wherein all of the field copper is in use at the same time. Even the unfavorable shunt winding serves as a resistance shunting the armature to assist in determining this characteristic. The design is well-adapted, particularly where only one pole is wound, to using a continuous wire in both shunt coils and another continuous wire in both series coils, for economical manufacture where possible; but the design is equally well-adapted to the other circumstance requiring entirely different specifications of stall, full load, and no load requirements in each direction of rotation, necessitating possibly four different wire sizes in the field windings.

Further objects and advantages of the present invention will be apparent from the following description, reference being had to the accompanying drawings wherein a preferred embodiment of the present invention is clearly shown.

Figure 2:
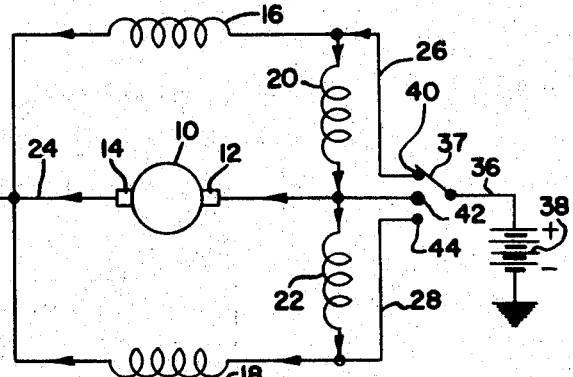
Figure 3:
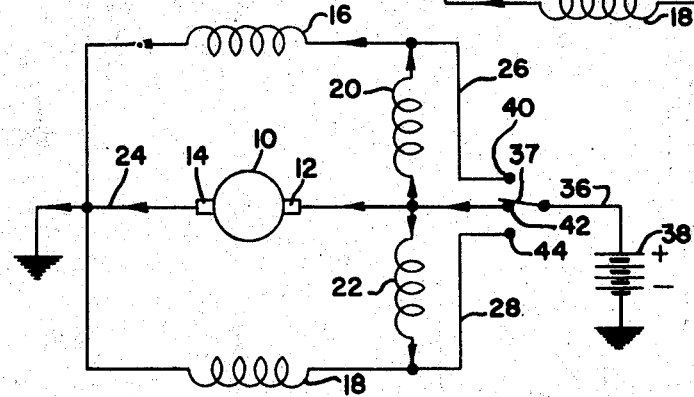
Figure 4:
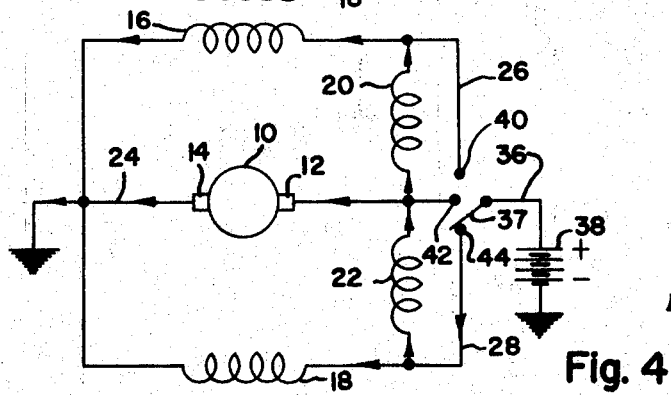

In the drawing:
FIGURE 1 is a schematic illustration of the split compound motor connected for rotation in opposite directions.
FIGURES 2, 3 and 4 are schematic illustrations of the motor connected for rotation in one direction at different speeds.

With reference to FIGURE 1, the split compound reversible motor of my invention includes an armature 10 having a conventional winding with or without a damper winding and a commutator to which energizing circuit is supplied by current collector brushes 12 and 14. The armature 10 is suitably supported for rotation by spaced bearings, not shown. The motor includes a stationary field assembly having either a single wound pole such as disclosed in copending application Serial No. 680,234 filed August 26, 1957, in the name of Simmons et al. and assigned to the assignee of this invention, now Patent No. 3,045,137, or two wound poles such as disclosed in copending application Serial No. 667,418 filed June 24, 1957, in the name of Simmons et al, and assigned to the assignee of this invention, now Patent No. 2,982,873. Irrespective of whether the motor has only a single wound pole or two wound poles, the motor operates as a two pole motor since the poles are magnetically connected by a suitable magnet frame which may be rectangular in configuration.

The magnet frame is magnetically excited by two split field windings, namely a tapped, or joined, shunt field winding and a tapped, or joined, series field winding. The shunt field winding includes coil sections 16 and 18 and the series field winding includes coil section 20 and 22. The coil sections 16 and 18 are adapted to be connected in shunt relation with the armature 10 while the coil sections 20 and 22 are adapted to be connected in series with the armature 10. When the split compound motor is to be used as a reversible motor, the shunt coil sections are wound so that the magnetomotive forces developed by said sections 16 and 18 buck each other.

As seen in the drawing, one end of each of the shunt coils 16 and 18 is connected to a wire 24, the wire 24 also being connected to the current collector brush 14 and to ground. The other end of coil 16 is connected to a wire 26, while the other end of the shunt coil 18 is connected to a wire 28. One end of each of the series coils 20 and 22 is connected to a wire 30, the wire 30 being connected with the current collector brush 12. The other end of series coil 20 is connected to wire 26 while the other end of series coil 22 is connected to the wire 28. Wire 26 connects with a fixed switch contact 30 and wire 28 connects with a fixed contact 32. The contacts 30 and 32 form part of a single pole double throw reversing switch including movable contact 34 which is connected by wire 36 to one terminal of a battery 38, the other terminal of which is connected to ground.

The shunt field coil 16 is designated a clockwise coil whereas the shunt field coil 18 is designated a counterclockwise rotation coil. When the movable switch contact 34 engages fixed contact 30, the clockwise shunt field coil 16 is energized by the full voltage of the battery 38 through wire 36, contacts 34 and 30, wire 26, the coil 16 and wire 24. At the same time, the series coil 20 and the armature 10 are connected across the battery 38 through wire 36, contacts 34 and 30, wire 26, coil 20, wire 30, brush 12, armature 10, brush 14 and wire 24. In addition, series coil 22 and the shunt coil 18 are serially connected in shunt across the armature 10 and across the battery 38 through series coil 20. Accordingly, during clockwise rotation the coils 16, 18, 20 and 22 are energized. However, whereas clockwise shunt coil 16 is energized at full battery voltage, counterclockwise shunt coil 18 is energized at a lower voltage since it is connected in series with coils 20 and 22. Therefore, the magnetomotive force developed by coil 18 is substantially less than the magnetomotive force developed by coil 16, and the resulting flux produced by the shunt field is in the direction for clockwise torque. Both coils 20 and 22 of the series field develop magnetomotive force assisting the shunt field to provide flux for clockwise torque. Thus, when the reversing switch 34 engages contact 30 the armature 10 will rotate in the clockwise direction.

To reverse the direction of rotation of the armature 10, the reversing switch 34 is moved into engagement with fixed contact 32. When the reversing switch 34 engages contact 32, the counterclockwise shunt field coil 18 is energized at battery voltage through wire 36, contacts 34 and 32, wire 28, coil 18 and wire 24. On the other hand, the direction of current flow through the series field coils 20 and 22 is reversed whereupon the flux developed by the coils 20 and 22 produces a counterclockwise torque on the armature 10. Since the direction of current flow through the clockwise shunt field coil 16 does not change, the magnetomotive force developed by the shunt coil 16 bucks the magnetomotive force developed by the counterclockwise shunt field coil 18. However, since the shunt field coil 18 is energized at full battery voltage whereas the shunt field coil 16 is energized at a lower voltage through the series connection with series coils 20 and 22, the magnetomotive force of the shunt field winding 18 producing counterclockwise torque will prevail. Moreover, it is pointed out that during counterclockwise rotation all of the field coils are energized.

The resultant motor can be controlled by a simple single pole double throw reversing switch and has a high stall torque similar to that of a split series reversible motor. In addition, the split compound wound motor has a relatively low no load speed which can only be obtained in a conventional split series motor by using damper windings of one type or another. Since the split compound motor has a relatively low no load speed, it is more quiet in operation under light load conditions than a conventional split series motor.

With particular reference to FIGURES 2 through 4, the motor of this invention can also be used as a multi-speed unidirectional motor with the field windings connected in cumulative compound (slow speed) as in FIGURE 2; in shunt (medium speed) as in FIGURE 3; or in differential compound (high speed) as in FIGURE 4. To achieve this type of operation, the coil sections 16 and 18 are wound so that the magnetomotive forces developed thereby assist each other. Speed is controlled by a switch having three fixed contacts 40, 42 and 44 and a movable contact 37. Fixed contact 40 is connected to the junction of coils 16 and 26; the fixed contact 42 is connected to the junction of coils 26 and 28; and fixed contact 44 is connected to the junction of coils 18 and 28. The magnetomotive forces developed by the coils 16, 18, 20 and 22 assist each other in FIGURE 2; the magnetomotive force developed by coil 20 bucks that of coils 16, 18 and 22 in FIGURE 3; and the magnetomotive force of coils 20 and 22 bucks that of coils 16 and 18.

While the embodiment of the invention as herein disclosed constitutes a preferred form, it is to be understood that other forms might be adopted.

What is claimed is as follows:

1. A dynamoelectric machine including a rotatable armature, a stationary field magnet assembly, means for exciting the field magnet assembly including a pair of series field windings, one of substantially more turns than the other, and a pair of shunt field windings, one of different wire size than the other, said shunt field windings being wound to develop opposing magnetomotive forces, and means for simultaneously energizing all of said field windings and selectively connecting one of said shunt field windings in shunt across said armature, one of said series field windings in series with said armature, and the other of said series field windings and the other of said shunt field windings in series relation to each other and in shunt across said armature to obtain rotation of the armature in opposite directions with different performance characteristics.

2. A dynamoelectric machine including a rotatable armature, a stationary field magnet assembly, means for exciting the field magnet assembly including a pair of series field windings and a pair of shunt field windings, said shunt field windings being wound to develop cumulative magnetomotive forces, and means for simultaneously energizing all of said field windings and for connecting said field windings in cumulative compound relation to obtain slow speed rotation of said armature with one of said series field windings and one of said shunt field windings being connected in series relation to each other and in shunt across said armature, the other of said series field windings being connected in series with said armature, and the other of said shunt field windings being connected in shunt across said armature.

3. A dynamoelectric machine including a rotatable armature, a stationary field magnet assembly, means for exciting the field magnet assembly including a pair of series field windings and a pair of shunt field windings, said shunt field windings being wound to develop cumulative magnetomotive forces, and means for simultaneously energizing all of said field windings and for connecting said field windings in shunt relation to obtain intermediate speed rotation of said armature with one of said series field windings and one of said shunt field windings being connected in series relation to each other and in shunt across said armature, and the other of said series field windings and the other of said shunt field windings being connected in series relation to each other and in shunt across said armature.

4. A dynamoelectric machine including a rotatable armature, a stationary field magnet assembly, means for exciting the field magnet assembly including a pair of series field windings and a pair of shunt field windings, said shunt field windings being wound to develop cumulative magnetomotive forces, and means for simultaneously energizing all of said field windings and for connecting said field windings in differential compound relation to obtain high speed rotation of said armature with one of said series field windings being connected in series with said armature, one of said shunt field windings being connected in shunt across said armature, and the other of said series field windings and the other of said shunt field windings being connected in series relation to each other and in shunt across said armature.

References Cited in the file of this patent

UNITED STATES PATENTS

| | | |
|---|---|---|
| 2,443,459 | Johnson | June 15, 1948 |
| 2,452,966 | Thomas | Nov. 2, 1948 |